(12) United States Patent
Chen et al.

(10) Patent No.: US 8,789,004 B2
(45) Date of Patent: Jul. 22, 2014

(54) AUTOMATIC FLOW OF MEGACELL GENERATION

(75) Inventors: Hsiao-Hui Chen, Hsinchu (TW); Shiue Tsong Shen, Tuku Township (TW); Cheok-Kei Lei, Macau (MO)

(73) Assignee: Taiwan Semiconductor Manufacturing Company, Ltd. (TW)

( * ) Notice: Subject to any disclaimer, the term of this patent is extended or adjusted under 35 U.S.C. 154(b) by 0 days.

(21) Appl. No.: 13/326,670

(22) Filed: Dec. 15, 2011
(Under 37 CFR 1.47)

(65) Prior Publication Data

US 2013/0091483 A1    Apr. 11, 2013

Related U.S. Application Data

(60) Provisional application No. 61/424,163, filed on Dec. 17, 2010.

(51) Int. Cl.
*G06F 9/455* (2006.01)
*G06F 17/50* (2006.01)

(52) U.S. Cl.
USPC ........... 716/134; 716/107; 716/108; 716/111; 716/113

(58) Field of Classification Search
USPC ......................................... 716/106–115, 134
See application file for complete search history.

(56) References Cited

U.S. PATENT DOCUMENTS

| 5,917,728 | A  | * | 6/1999 | Ueda .............................. 716/103 |
| 7,137,082 | B1 | * | 11/2006 | Zohar ............................ 716/102 |
| 7,373,631 | B1 | * | 5/2008 | Yuan et al. ..................... 716/105 |
| 2002/0069396 | A1 | * | 6/2002 | Bhattacharya et al. ........... 716/7 |
| 2009/0187870 | A1 | * | 7/2009 | Yifrach et al. .................... 716/9 |

OTHER PUBLICATIONS

Liu, Chia-Pin R., et al., "Transistor Level Synthesis for Static CMOS Combinational Circuits", IEEE Xplore, Feb. 4, 2009.

* cited by examiner

*Primary Examiner* — Nha Nguyen
(74) *Attorney, Agent, or Firm* — Lowe Hauptman & Ham, LLP

(57) ABSTRACT

A method and system optimizes or improves an electronic design by analyzing various signal paths in the electronic design and selecting certain critical paths, for example, failed-timing paths, to optimize. The optimizing method extracts the cascaded logic gates to create a megacell representing the function of the critical path, compare test parameters of the megacell with the critical path, and incorporate the megacell into the electronic design if the test parameters improve by an optimizing constraint.

20 Claims, 5 Drawing Sheets

AUTOMATIC FLOW OF MEGACELL GENERATION

CROSS-REFERENCE TO RELATED APPLICATIONS

The present application claims priority of U.S. Provisional Patent Application No. 61/424,163, filed on Dec. 17, 2010, which is incorporated herein by reference in its entirety.

FIELD OF THE INVENTION

The present disclosure relates to semiconductor IC fabrication generally and, more specifically, to methods and systems for optimizing an electronic design for semiconductor IC fabrication.

BACKGROUND

As integrated circuits (IC) have become smaller and more complex, IC designers depend on electronic design automation (EDA) software tools to facilitate the design of integrated circuits. Typically, the integrated circuit design process begins with a specification, which describes the functionality of the integrated circuit and may include a variety of performance requirements. Then, during a logic design phase, the logical implementation of the IC functionality is described using one of several hardware description languages such as Verilog or VHDL at the register transfer logic (RTL) level of abstraction. Typically, the EDA software tool synthesizes the abstract logic into a technology dependent netlist using a standard cell library from an IC manufacturer.

A standard cell is a group of transistors and interconnect structures that provides a Boolean logic function (e.g., AND, OR, XOR, XNOR, inverters) or a storage function (flipflop or latch). The simplest cells are direct representations of the elemental NAND, NOR, and XOR Boolean function, although cells of much greater complexity are commonly used (such as a 2-bit full-adder, or muxed D-input flipflop.) The cell's Boolean logic function is called its logical view: functional behavior is captured in the form of a truth table or Boolean algebra equation (for combinational logic), or a state transition table (for sequential logic).

A standard cell library includes hundreds or even thousands of standard cells, with which all logical representations may be implemented. The library includes various types of information about each of its standard cells, including its logic function, layout, power consumption, signal propagation delay, etc. These cells are realized as fixed-height, variable-width structures. The fixed-height enables them to be placed in rows, easing the process of automated digital layout. The library usually contains multiple implementations (cells) of the same logic function, differing in area and speed. Automated synthesis, place, and route (SPR) tools can then select the most efficient cell, based on the design requirements. The netlist is the standard cell representation of the IC design, at the logical view level. It consists of instances of the standard cells, and port connectivity between standard cells. Synthesis techniques ensure logical equivalency between the synthesized netlist and original RTL description.

After completion of the logic design phase, the IC undergoes a physical design phase, often referred to as place and route. Here, EDA software tools layout, or place, each cell in a floorplan. The result contains the physical location of each of the netlist's standard cells, but retains an abstract description of how the cell terminals are wired to each other. Each cell is assigned a unique (exclusive) location in the floorplan or the die map. A given cell is placed once, and may not occupy or overlap the location of any other cell. Then the physical components are connected, or routed, by adding interconnects between all of components that communicate with each other and with input/output pins outside of the IC according to the logic representation. In addition to signal connection lines, power supply lines and ground lines are also added at this time. At the end of the physical design phase, the representation of the semiconductor chip (in which the integrated circuit is implemented) is in the form of a Graphic Database System (GDS) or GDS II file.

Various verification processes such as Design Rule Check (DRC) and Layout Versus Schematic (LVS) are performed to verify the placed and routed IC can be manufactured and would work. DRC exhaustively compares the physical netlist and/or the GDS II file against a set of design rules from the IC manufacturer, then flags any observed violations for subsequent redesign. Examples include transistor spacing, metal layer thickness, and power density rules. The LVS process confirms that the layout has the same structure as the associated schematic; this is typically the final step in the layout process. The LVS tool takes as an input a schematic diagram and the extracted view from a layout. It then generates a netlist from each one and compares them. Nodes, ports, and device sizing are all compared. If they are the same, LVS passes and the design can continue.

While the current physical design process is able to implement all logic representations, improvements for optimizing the design to satisfy and/or maximize particular performance requirements continue to be sought.

DETAILED DESCRIPTION

Figure 1:
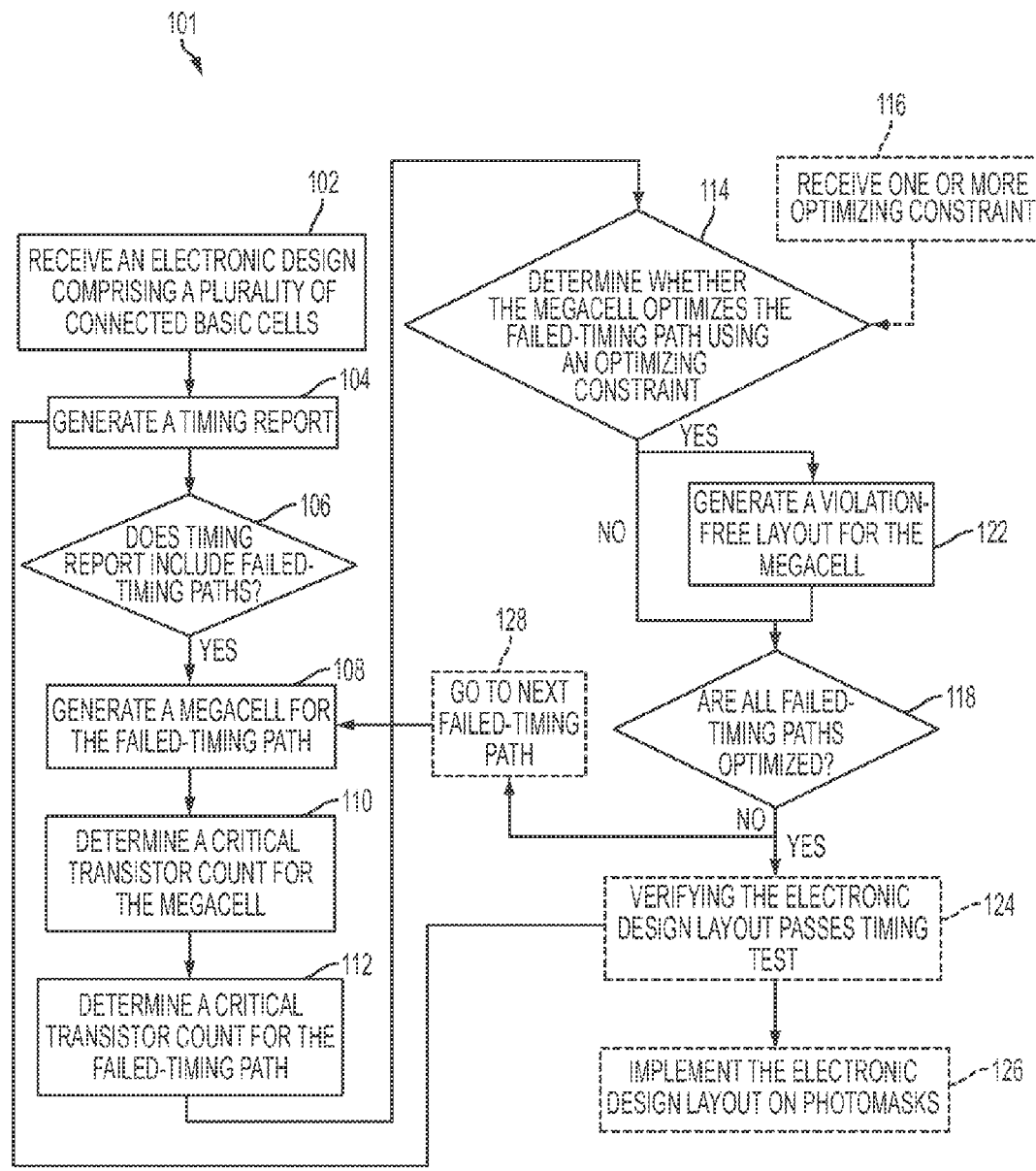
FIG. 1 is a flow chart for a method in accordance with various embodiments of the present disclosure.

This description of the exemplary embodiments is intended to be read in connection with the accompanying drawings, which are to be considered part of the entire written description. In the description, relative terms such as "before," "after," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the system be constructed or operated in a particular orientation. Terms concerning attachments, coupling and the like, such as "connected" and "interconnected," refer to a relationship wherein components are attached to one another either directly or indirectly through intervening components, unless expressly described otherwise.

While a standard library includes standard cells required to perform all logic functions, not all standard cells work equally in all aspects of performance. Standard cells are usually developed over a period of time, with many iterations to refine certain aspects of performance. Usually, standard cells are designed to minimize cell area, so that the dies can be made smaller and more dies can fit on one wafer to minimize cost. However, in some circumstances speed of the IC may be more important than cell area. For example, speed performance may be a specified requirement. However, these aspects of performance may or may not be the same objectives as the IC designer. While many ICs have speed requirements, some IC designers may care even more about power consumption, i.e., for a mobile device. Standard cell design is a highly labor intensive job. Long IC design cycle times limit the total number of standard cells in a library so as to reduce processing by design tools.

When an electronic design does not meet certain performance requirements through the synthesis, place, and route (SPR) cycle, fixing or optimizing the electronic design tends to be a labor-intensive process. The HDL code may be rewritten in parts to call on different standard cells. The die floorplan may be redesigned with more efficient layout of input-output pins. Routing parameters may be changed to favor slowest logic functions. Because each change causes many downstream changes, some of which are unknown to the IC designer, these changes are time consuming because each SPR cycle to test a change takes a long time, sometimes on the order of a number of days for large designs.

One such labor-intensive fix is to find frequently used standard cell combinations and replace them with customized cells specially designed for a particular aspect of performance. Customized cell design is labor-intensive, time-consuming and error prone, with no guarantee of success in fixing or optimizing the original electronic design. The workflow to design a customized cell includes determining the transistors required for the cell and placing the transistors in a cell and then routing the interconnect structures to various input and outputs of the transistors in a physical design. Unlike using an EDA tool for the SPR process to design an IC, many of these steps are performed manually and separately. Then the cell is debugged against IC manufacturer design rules for the particular technology node and any violations found are fixed. Thus, customized cells are IC manufacturer specific and technology node specific. One cannot take a customized cell designed for Manufacturer A to Manufacturer B and ask for it to be made. More likely than not, the design rules and even the current technology node are different. Because of the large investment in labor and time, customized cells are used only when a particular standard cell combination recurs with a very high frequency so that optimizing the combination becomes worthwhile. In any case, the frequent standard cell combination may not even be the lowest performer such that optimizing it would significantly improve the overall design.

The various embodiments of the present disclosure involve a method and a system for optimizing an electronic design by creating and using megacells in the electronic design. A megacell is a system generated cell that represents a logic function that is represented by a standard cell or a combination of standard cells in a critical path. A megacell is not part of the standard library. The critical paths are the least performing signal paths determined by testing the electronic design against one or more test parameters. A megacell need not be a frequently used cell or cell combination, but is a cell or cell combination such that optimizing it would significantly improve performance of the overall design.

The method and system may be used to optimize a test parameter, which may be timing. To optimize or fix timing, the method includes receiving an electronic design comprising a plurality of connected standard cells; generating a timing report for the electronic design; generating a megacell for said each failed-timing path; determining a critical transistor count for the megacell; determining a critical transistor count for the failed-timing path; determining whether the megacell optimizes the failed-timing path using an optimizing constraint; and, generating a violation-free layout for the megacell using a megacell netlist. The timing report includes one or more failed-timing paths that are each a combination of standard cells. The megacell and the failed-timing path perform the same function. The optimizing constraint includes a minimum reduction of the critical transistor count from the failed-timing path to the megacell. For example, the minimum reduction may be 2. After a new electronic design including one or more megacells is generated, the timing test may be repeated to verify that the new electronic design passes timing. The system includes a computer-readable storage medium, a processor, an output device, and an optional input device for performing various operations of the disclosed methods.

The optimizing constraint may also be a specified difference in stack number count of the failed-timing path and the megacell; a specified reduction of total cell area from the failed-timing path to the megacell; or a specified reduction of power consumption from the failed-timing path to the megacell. These optimizing constraints may be an input from an external source or a variable built in the system.

The operation of generating a megacell for each failed timing path may include extracting a set of cascaded logic gates for said each failed-timing path; converting the set of cascaded logic gates for each failed-timing path to a function for each failed-timing path; optimizing the function for each failed-timing path; generating a binary tree using the optimized function; and generating a megacell netlist using the binary tree. Dynamic programming may be used to find an optimized function.

The operation of generating violation-free layout for the megacell using a megacell netlist may include fixing design rule check (DRC) violations in the netlist; and, placing and routing the netlist using one or more routing priority modes to generate a violation-free layout. The violation-free layout includes only routable and routed nets. The DRC evaluation and fixing may occur at multiple times during this operation. The placing and routing the netlist using one or more routing priority modes may include placing and routing the netlist using a first routing priority mode to generate a first layout; if any net is un-routable, analyzing the un-routable nets; selecting a second routing priority mode to route the un-routable nets using the analysis of the un-routable nets; placing and routing the netlist using the second routing priority mode to generate a second layout; repeating the analyzing, selecting, placing and routing, and comparing until no un-routable nets are found; and, comparing the second layout to a schematic of the megacell. In some embodiments, the iterative process may include other changes such as placement of the netlist components or net weight in addition to routing priority mode to find a violation-free layout.

Another aspect of the present disclosure involves using the methods and system to optimize an electronic design for test parameters other than timing. The test parameters may be stack number, total cell area, power, or a combination of these, or a combination of these with timing. Critical paths for optimizing are chosen from a test report of the relevant test parameter. A megacell is generated for each critical path and evaluated to see whether sufficient improvement in the test parameter warrants using the megacell in the electronic design. Yet another aspect of the present disclosure involves a computer readable storage medium having instructions that, when executed, performs various methods of the present disclosure.

FIG. 1 is a flow chart for a method 101 in accordance with timing embodiments of the present disclosure. In operation 102, an electronic design of connected basic cells is received. The electronic design may be in the form of a netlist synthesized from a hardware description language (HDL) file or a layout generated by a synthesize, place, and route (SPR) process from an HDL file. The layout may be in the form of a graphic database system II (GDS II) file. Usually, an IC manufacturer is given the netlist or the layout as a specification with which to make the IC. Sometimes, the layout is generated by the IC manufacturer using a customer provided HDL file and other inputs. From the electronic design, a timing report is generated in operation 104 by performing a timing test. The timing test simulates the electronic design under various operating conditions and measures the speed performance for individual components and the overall electronic design. An example timing test is Prime Time available from Synopsys, Inc. of Mountain View, Calif.

The timing report shows the result of the timing test. The timing report may include a number of signal paths that are designated as critical paths. Critical paths may have failed timing requirements, as determined in operation 106, or have some other property as designated by the tester. While not all critical paths are necessarily failed-timing paths, all failed-timing paths are critical paths. A failed-timing path must be fixed before the design can pass the timing test, and one method of fixing is creating a megacell to replace the failed-timing path.

A signal path is evaluated for the worst-case scenario. A signal path may perform differently during the rise path and the fall path. A signal path may fail timing only for certain inputs but not for others. Even if the certain inputs that would cause a timing failure are rare during actual operation, the signal path is said to have failed timing and is a failed-timing path. A failed-timing path may be just one standard cell or include two or more standard cells that abut each other. If the test report includes failed-timing paths, then a megacell is generated for the failed-timing path in operation 108. Even if there is no failed timing path, a designer may still generate a megacell for a critical path to optimize the design.

Figure 2:
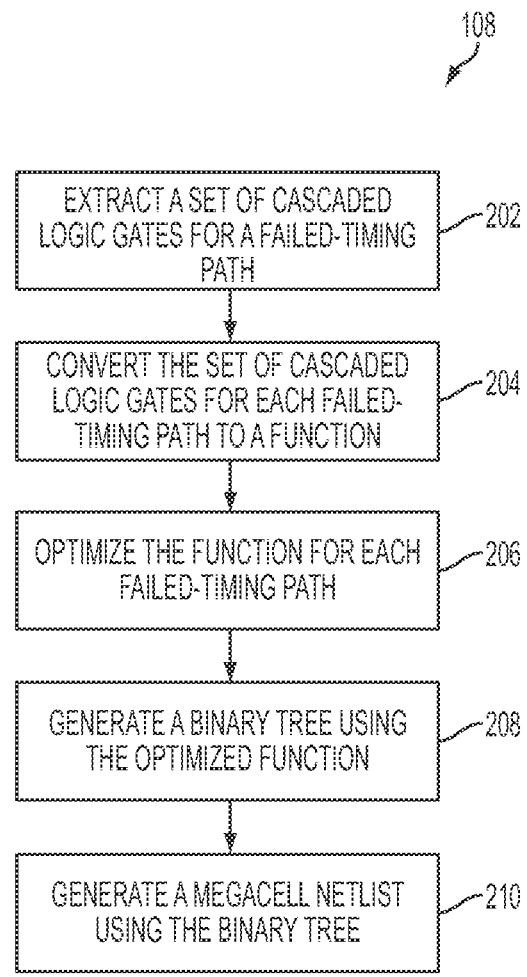
FIG. 2 is a flow chart for a generating a megacell in accordance with various embodiments of the present disclosure.

FIG. 2 is a flow chart showing the steps for operation 108 to generate a megacell in accordance with various embodiments of the present disclosure. In operation 202, the failed-timing path is expanded to extract a set of cascaded logic gates. The logic description is usually not available to the IC manufacturer because only the netlist or the layout is normally provided. Thus, the logic function of the failed-timing path is determined from the cascaded logic gates. In operation 204, the set of cascaded logic gates is converted to a function. The function necessarily describes the failed-timing path. Note that several functions may describe the set of cascaded logic gates. While more than one function may describe the same set of cascaded logic gates, the nature of the conversions requires that these functions are equivalent for the purposes of generating a megacell. At this point, a system generates a function, any function, that describes the cascaded logic gates.

In operation 206, the function is optimized at the transistor level. The optimizing may be performed using dynamic programming methodology. In one embodiment, every possible permutation of the function is generated to evaluate at the transistor level to find the optimized function. The optimized function is the variation that performed better at one or more test parameters than all others at the evaluation. For timing, the one or more test parameters to optimize include the number of transistors in a worst-case scenario path—the number of transistors is directly correlated to the amount of time required to traverse the path. For cell size or power, the parameter to optimize may include the total number of transistors for the function, because each transistor has a footprint in the size and also requires power whether used or not.

Once the optimized function is found, then a binary tree is generated for the optimized function in operation 208. The binary tree maps the signal path at the gate level and allows a transistor-level synthesis to be performed without a cell library. Using the binary tree, a megacell netlist is generated in operation 210 using various methodologies to track and record all gates and connections. An example methodology is a depth-first traversal methodology. Note that the binary tree and netlist generation may optionally occur later in the process after determining whether the megacell optimizes the failed-timing path. In certain cases, the megacell netlist is generated first, for example, when the netlist is required to determine a critical transistor count. In other cases, the netlist generation occurs later only after a decision is made to incorporate the megacell in the electronic design. The later netlist generation reduces system resource consumption because only subsequently used megacell netlists are generated.

Referring back to FIG. 1, once the megacell is generated in operation 108, a critical transistor count is determined in operation 110 for the megacell and in operation 112 for the failed-timing path. The critical transistor count depends on the test parameter to be optimized and more than one critical transistor count may be determined if multiple test parameters are used. For speed, the critical transistor count is the number of transistors in the worst-case scenario path, which may be a rise path or a fall path, and may depend on the input signals. For power consumption or cell area, the critical transistor count may be a total number of transistors in the megacell. Another critical transistor count may be a stack number, which defines the maximum number of transistors in a path from power node to output node in one stage in a multi-stage cell, where each stage generally shares an input and/or an output node.

The critical transistor count determined in operations 110 and 112 are compared to determine whether the megacell optimizes the failed-timing path in operation 114. As input to the comparison, one or more optimizing constraint may be inputted in operation 116, from an external source or within the system. For example, an optimizing constraint may be that the critical transistor count in the worst-case path must improve by 2 transistors or more. This optimizing constraint limits the use of megacells to failed-timing paths that would benefit the most in terms of speed. In some cases, perhaps even a modest improvement of one transistor warrants the use of a megacell. Other optimizing constraints may be used in conjunction with the critical transistor count in the worst-case path and includes a specified difference in stack number count of the failed-timing path and the megacell, a specified reduction of total cell area from the failed-timing path to the megacell, and a specified reduction of power consumption from the failed-timing path to the megacell. The specified reduction of total cell area and the specified reduction of power consumption may be approximated using a total number of transistors. For example, the requirement may be that both the worst-case path must improve by two transistors or more, but if not, then an improvement of least one transistor in the worst-case path must be accompanied by improvement of at least two transistors in the total transistor count.

If the megacell does not optimize the failed-timing path, then the process followings the "no" decision line and proceeds to operation 118 to determine whether all failed-timing paths are considered for optimizing. If not all failed-timing paths are considered, then the next failed-timing path is considered in operation 128 and the process continues at operation 108 with generation of a new megacell for the next failed-timing path.

If the megacell is determined in operation 114 to optimize the failed-timing path, the process proceeds to operation 122 where a violation-free layout is generated for the megacell. Operation 122 is shown in more detail in FIG. 3.

Figure 3:
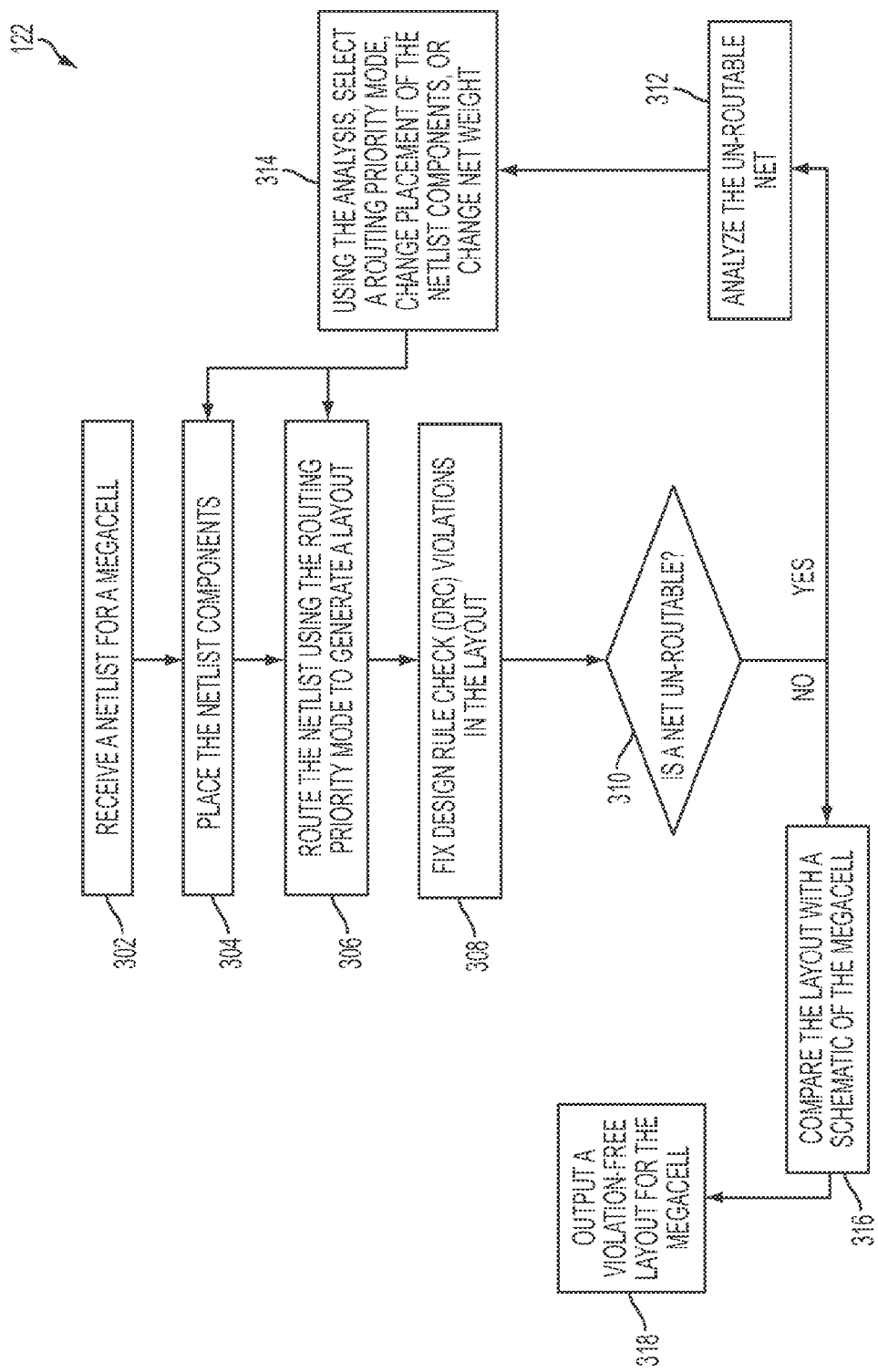
FIG. 3 is a flow chart for a generating a violation-free layout using a megacell in accordance with various embodiments of the present disclosure.

FIG. 3 is a flow chart for a generating a violation-free layout using a megacell in accordance with various embodiments of the present disclosure. In operation 302, a netlist for a megacell is received. This netlist may be a netlist generated in operation 210 of FIG. 2 using the binary tree, or a subsequently generated pre-layout netlist for the megacell.

The netlist components, including transistors and input/output components for the cell are placed in operation 304. The components are placed using a placement methodology that enhances sharing of transistor drains and sources and creates an active region using different weights for different nets in the netlist.

The placement methodology includes one or more concepts of metal-oxide-semiconductor field-effect transistor (MOSFET) pairing, MOSFET chaining, and chain placement. One MOSFET pairing concept is to match a p-type MOSFET with an n-type MOSFET in order of several preferences. A first preference is to match p-type and n-type MOSFETs with the same gate node. A second preference is to match pairs with same drain and/or source. Any unmatched MOSFETs are paired with dummy devices. The MOSFET chaining concept forms groups of MOSFET pairs for ease of connection. For example, two MOSFET pairs using the same gate node are merged into a chain. Other MOSFET pairs with similarities and/or with close connections with each other are also chained together to form a MOSFET pair chain. Other example chains include mirror-image MOSFET pairs and where a source/drain diffusion feature can be shared between adjacent MOSFET pairs. During chain placement, MOSFET pair chains are placed according to their connections so that MOSFETs that communicate with each other across different chains are placed as close as possible, sometimes by horizontally flipping a chain. Once the MOSFETs are placed, the pin ports for each transistor and for the megacell are placed. Usually at least a poly contact pin is assigned to each MOSFET. Pin port conflicts are resolved using a bipartite conflict graph to find the best pin port location for each poly contact.

The connections are then routed in operation 306. Several routing tracks in the first metal layer are computed. The number of routing tracks is limited by the height of the megacell (corresponding to the length of the gates) and the minimum track width and spacing. In the first pass, a greedy method is used to select a routing track for each component in a net. Nets are the "wires" that connect things together in the circuit. All components in a net are connected together in a node. Then all horizontal nets are grouped such that a total minimum number of tracks is used, i.e. by grouping horizontal nets that do not overlap on the same track so that one track can have two or more nets. Each net is given a weight, which is used to prioritize the routing sequence.

For more complicated nets, a minimum spanning tree (MST) algorithm is used to find the minimum number of nets. The simple nets are routed by pattern routing methods; and the complex nets are routed by maze routing methods. To reduce routing resources, the contact pin locations may be shifted to more convenient positions. Contact pin locations may be shifted to make room for another route or to reduce the length of interconnects.

The placed and routed layout is checked against design rules (DRC) and any DRC violations fixed in operation 308. As discussed, DRC contains IC manufacturer specific rules for manufacturing an IC at a particular technology node. Violations of the DRC would present production issues for the megacell in the IC. The DRC fix occurs initially at operation 302, and may occur subsequently at several points during the flow of FIG. 3, for example, after a satisfactory comparison of a layout with a schematic of the megacell in operation 316.

After the initial routing, any un-routable net is determined in operation 310. The un-routable net is analyzed in operation 312. Based on the analysis, the netlist is re-placed and/or re-routed by changing at least one input in operation 314.

The netlist may be re-routed by using a different routing priority mode. For example, a particular type of net, such as p-n nets, may be routed first, then cross over nets may be routed next. Cross over nets are nets that cross transistors between the p-type side and n-type side. The netlist may also be re-routed by setting a higher weight for un-routable nets. The un-routable nets may be routed first and the previously earlier routed nets routed afterward. During the re-routing, some nets may be closed to re-routing while others are re-routed. If re-routing alone cannot route all the nets, for example, after a certain number of re-routing iterations, then a portion of the netlist components may be re-placed.

The netlist may be re-placed by shifting one or more component locations. The active region may be made larger to allow one or more transistor to shift by one pitch, in other words, by the width of one transistor. In some embodiments, one of each p-type MOSFET and n-type MOSFET may be shifted one pitch at different locations or same locations. The free-up area may be used for routing. When the shift occurs at the same location, the shifting may allow a cross over net (connecting contacts from the n-type region to the p-type region) to be made. At different locations, the shifting can allow different wiring paths, for example, to avoid being too close to a pin port or another contact. In some embodiments, the re-placing and re-routing may be performed multiple times with different nets closed to re-routing until a solution is found.

In some embodiments, multi-contacts are inserted to further simplify the layout. Multi-contacts lay across two or more transistors that share a gate signal and reduces the total number of pins. Other layout optimization may include fixing DRC violations and moving contact pins to reduce corners.

If all nets in the netlist are routed as determined in operation 310, then the layout is compared with a schematic of the megacell in operation 316. The layout versus schematic (LVS) comparison confirms that the layout has the same structure as the associated schematic. The LVS tool takes as an input a schematic diagram and the extracted view from a layout. It then generates a netlist from each one and compares them. Nodes, ports, and device sizing are all compared. If they are the same, LVS passes and the megacell layout can continue to operation 318, where a violation-free layout for the megacell is outputted in a GDS structure.

Referring back to FIG. 1, the process 101 continues by determining whether all failed-timing paths are optimized in operation 118. If so, then all the megacells are incorporated into the electronic design. In certain embodiments, the timing test is performed on the new electronic design incorporating the megacells and improvements in the timing test verified in operation 124. If the new electronic design does not pass the timing test, then a new set of failed-timing paths is extracted and the process repeats from operation 104. Optimizing the failed-timing paths may not make them pass the timing test if the optimizing constraint and the timing test criteria measure different parameters. Also not all of the failed-timing paths may be optimized, because, for some, a better path may not be possible or capable of implementation in a layout. However, generally merging two or three standard cells into one cell should provide performance benefits. Also in some cases the optimization may have affected some circuitry such that new critical paths, some of which may be failed-timing paths, may be created in a new layout of the electronic design.

In operation 126, the layout of the electronic design incorporating the megacells may be implemented on photomasks and used in the IC manufacturing process. In some cases, the implementation on photomasks occurs at an entity separate from the IC manufacturer. The preceding discussion deals primarily with a process for fixing timing failure. However, the concepts of the present disclosure applies equally well to a process for optimizing an electronic design with respect to power consumption or cell area.

Note that various operations are optional in the flow chart of FIG. 1. One or more of operations 116, 124, 126, and 128 may be omitted. Operation 116 may be omitted if the one or more optimizing constraint is generated by the system. Operation 128 may be omitted when only one failed-timing path is considered for optimization. Operation 124 may be omitted under various conditions including when the optimizing constraint is set very high so that a new electronic design is sure to pass the timing test or when the timing test is performed by another entity. Operation 126 may also be performed by another entity.

Figure 4:
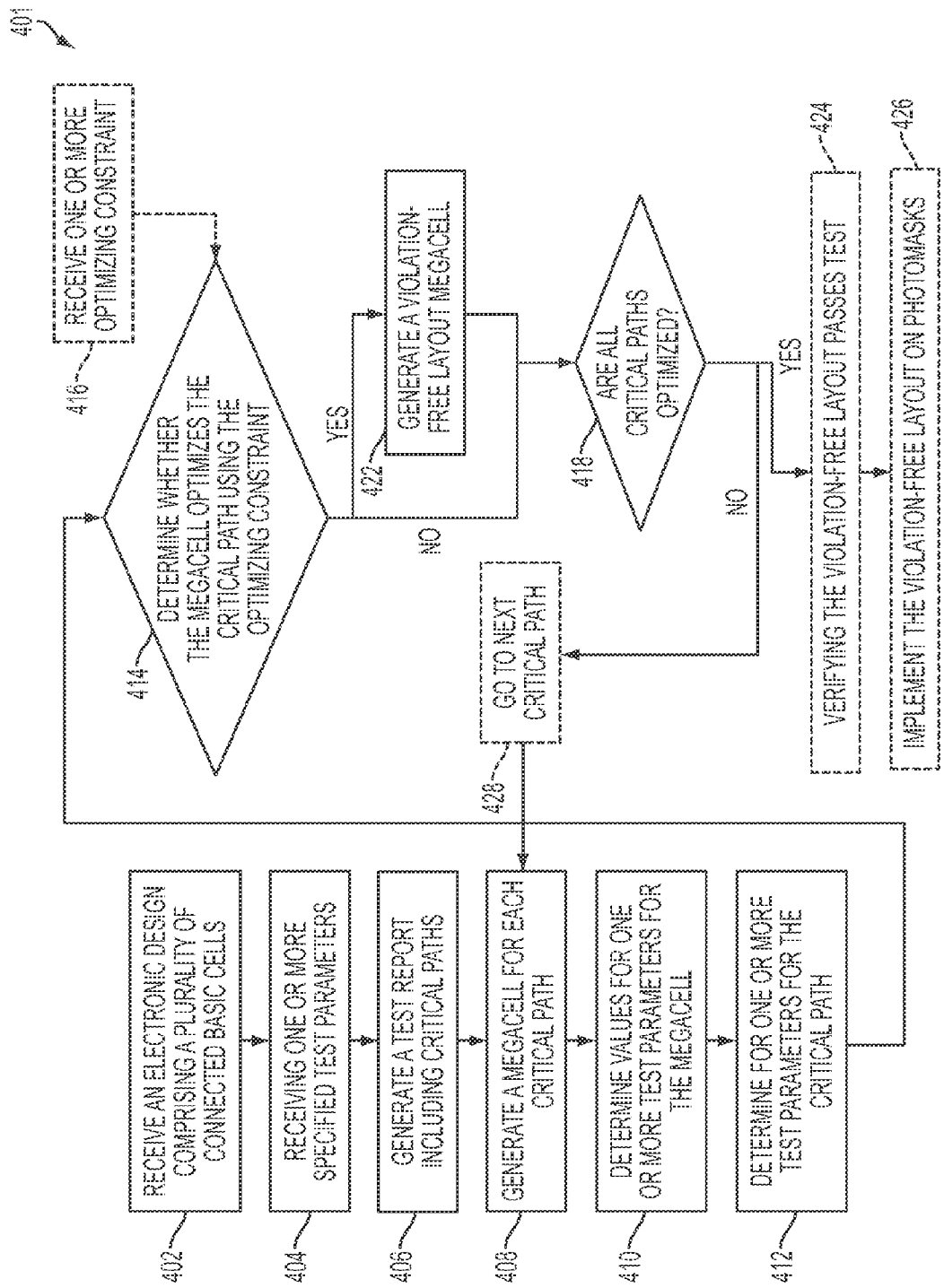
FIG. 4 is a flow chart for a method in accordance with various embodiments of the present disclosure.

FIG. 4 is a flow chart for an optimizing method 401 in accordance with various embodiments of the present disclosure. FIG. 1 and FIG. 4 are similar in many aspects. The following discussion of FIG. 4 focuses on differences and does not repeat similar details already discussed in association with FIG. 1 and instead where applicable refers to operations from FIG. 1 and associated text.

The process 401 starts at operation 402 where an electronic design comprising a number of standard cells is received. Operation 402 is the same as operation 102 of FIG. 1. In operation 404, one or more specified test parameters to optimize are received. In some embodiments, the one or more test parameters and the relationship between them if there is more than one, are inputs from an external source. For example, an electronic designer may choose to select minimizing power or minimizing die size or increasing speed as a test parameter. Other test parameters may become available or apparent to one skilled in the art. Generally, any test parameter that can be analyzed and reported by a testing tool may be used. To save on cost, one may opt to minimize die size so that more dies can be placed on one wafer. On the other hand, increasing speed can also save cost by allowing the chip to be built on an earlier technology node that costs less. Sometimes power consumption is the most important, for example, as a mobile device distinguishing itself from competitor products by a longer battery life. A combination test parameter may be used, such as the least power consumption at a certain speed, or smallest die within a certain timing constraint.

In operation 406, a test report is generated for the electronic design. An example test is a timing test, but other tests may be performed on the electronic design to gauge its performance. The test report includes critical paths, which are the least performing signal paths according to the chosen test parameter. As discussed, not all critical paths are failure paths from the various embodiments discussed above in association with FIGS. 1-3, but all failure paths are critical paths. As an example, if the test parameter chosen is power consumption, than a list of critical paths should include the highest power-usage signal paths. By concentrating megacell design efforts on only the worst performing signal paths, the megacell generation and layout can make a significant difference in the IC performance without excessive delay in the design cycle.

In operation 408, a megacell is generated for each critical path. Because reusing megacells is efficient, an additional parameter before generating a megacell may be the number of instances of the critical path. Critical paths that repeat often may be given a higher priority than a critical path that repeat less often for a given test parameter performance. Operation 408 is the same as operation 108 of FIG. 1.

In operation 410, values for one or more test parameters for the megacell generated in operation 408 are determined. This operation is similar to operation 110 in FIG. 1, but with a broader scope. In operation 110, a critical transistor count for the megacell is determined. The one or more test parameter of operation 410 may include a critical transistor count, but is not limited to a transistor count. Other variables important to the performance of the megacell and can be used in comparison with the critical path may be determined. Examples include standby power usage, a stack number, or the number of stacks/stages in the megacell.

In operation 412, the same one or more test parameters are determined for the critical path. These test parameters are then compared in operation 414 to determine whether the megacell optimizes the critical path using one or more optimizing constraints. The one or more optimizing constraints may be received in operation 416 from an external source or from within the system. The optimizing constraint specifies the amount of performance improvement required in order to utilize a megacell. Variables that affect the optimizing constraint may include the length of lead time, complexity and quality of the electronic design, and the test parameter being optimized.

If the megacell is determined in operation 414 to optimize the critical path, the process proceeds to operation 422 where a violation free layout is generated for the megacell. Operation 422 is the same as operation 122 of FIG. 1 and discussed in more detail in association with FIG. 3.

If the megacell is determined in operation 414 not to optimize the critical path, then the process proceeds to operation 418 via the "no" decision line to determine whether all critical paths are considered for optimizing. Also after generating the violation free layout, whether all critical paths are considered is determined in operation 418. If not all critical paths are considered, then process proceeds to the next critical path in operation 428. The process then continues at operation 408 with generation of a new megacell for the next critical path.

If all critical paths are considered, then at operation 424 the test report is generated for a new electronic design that incorporates all the megacells and improvements in the test parameters of operation 404 are verified. Operation 424 is similar to operation 124 of FIG. 1, but with a broader scope. In operation 124, a new timing test report is generated and passage of the timing test is verified. The test of operation 424 may be a timing test, but is not limited to one. Other tests important to the performance of the megacell generated in operation 404 may be used. Examples include power requirement and area limitation.

In operation 426, the layout of the electronic design incorporating the megacells may be implemented on photomasks and used in the IC manufacturing process. Operation 426 is the same as operation 126 of FIG. 1. Note that various operations are optional in the flow chart of FIG. 4. One or more of operations 416, 424, 426, and 428 may be omitted as discussed in association with operations 116, 124, 126, and 128 of FIG. 1.

Figure 5:
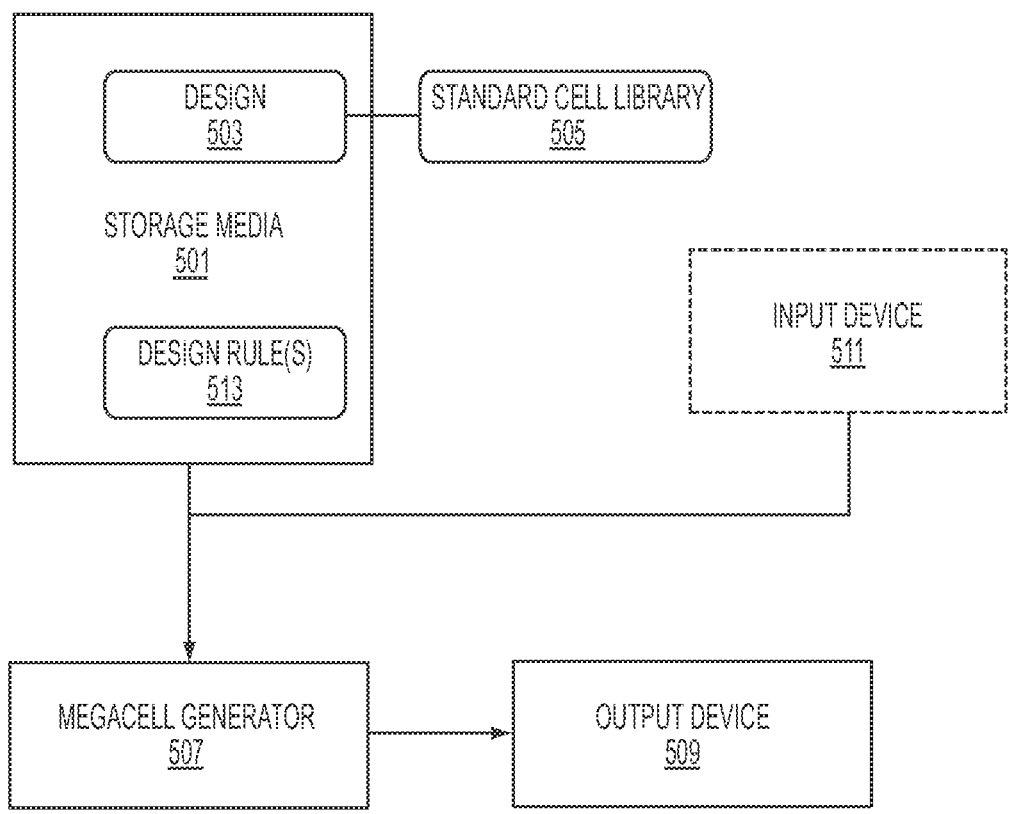
FIG. 5 shows a system for practicing various embodiments of the present disclosure.

FIG. 5 shows a system for practicing various embodiments of the present disclosure. The system includes one or more computer readable storage media 501 for storing input data used by the megacell generator 507. The storage medium 501 may include one or more of dynamic random access memory (RAM), SDRAM, a read only memory (ROM), EEPROM, a hard disk drive (HDD), an optical disk drive (CD-ROM, DVD-ROM or BD-ROM), or a flash memory, or the like. The input data includes the electronic design 503, which may include an identification of a plurality of standard cells to be included in an integrated circuit (IC) layout, including a list of cells within the plurality of cells to be connected to each other and other design information. The electronic design 503 is generated with standard cell library 505, which includes information about each of the standard cells in the design. The input data may also include design rules 513. Design rules may include default rules applicable to all designs or rules specific to a particular kind of design or the instant design. The input data may also include a test report.

The system may further include an input device 511 for entering test parameters, test reports, optimizing constraints and other information relevant to the electronic design during one or more iterative resolution of generating the megacell in the electronic design. The input device 511 may include a keyboard, a mouse, an electronic file reader, a touch screen, and a scanner.

The input device 511 and the computer readable storage media 501 are connected to the megacell generator 507. The megacell generator 507 is a special purpose computer formed that retrieves stored program instructions from the computer-readable storage medium 501 and executing the instructions on a processor. The megacell generator 507 may generate a test report using input from device 511 or utilize a test report that is already included in the input data from the computer-readable storage media 501. The megacell generator 507 executes stored program instructions to generate megacells according to the various embodiments of the present disclosure.

In some embodiments, the processor performs a method that includes receiving an electronic design 503 from a computer-readable storage media 501 comprising a plurality of connected standard cells, said standard cells from a standard library 505; generating a test report for the electronic design 503, wherein the test report comprises one or more critical paths and each critical path comprises a plurality of cells that perform a function in the electronic design 503; extracting a set of cascaded logic gates for each critical path; generating a megacell for each critical path, wherein the megacell and the critical path perform a same function; determining one or more test parameters for the megacell; determining one or more test parameters for the critical path; determining the megacell optimizes the critical path using an optimizing constraint, wherein the optimizing constraint comprises a minimum improvement of one or more test parameters; generating a netlist for the megacell; and, generating a violation-free layout for the megacell using the netlist.

The system further includes an output device 509 to output the result from the megacell generator 507. The output device 509 may include a computer-readable storage medium, for "taping out", a display, a printer, or an electronic transmitter for transmitting signals corresponding to the IC layout generated. The output computer-readable storage medium may be a separate storage device, or a portion of the same storage medium 501 described above and may be any of the types of storage media described above with respect to medium 501.

Various embodiments of the present disclosure were implemented in a system for two different IC designs. In both designs, various test parameters are compared before and after the megacell generation. Using only 10 types of megacells, each of the test parameters showed improvement from the original design to the design incorporating megacells. For the first IC design at a clock speed to 1.15 ns, the worst negative slack (WNS) improved from −0.1624 ns to −0.1274 ns, the total negative slack (TNS) improved from −173 ns to −92 ns, the number of violated path improved from 4900 to 3029, and the speed of the device improved from 762 MHz to 783 MHz. For the second IC design at a clock speed to 1.1 ns, the worst negative slack (WNS) improved from −0.048 ns to −0.026 ns, the total negative slack (TNS) improved from −5.4 ns to −1.291 ns, the number of violated path improved from 425 to 170, and the speed of the device improved from 871.1 MHz to 888 MHz. The implementation had a run time of only two days to generate a total of 1362 megacells.

The results show that the various embodiments of the present disclosure significantly optimize electronic design without changing standard cell architecture and prolonging electronic design cycle time. A minimum of manual layout/design resources is used to generate layout/designs that would have taken months to optimize manually and with no guarantee of success. Although the present embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of optimizing timing of an electronic design, the method comprising:
   receiving an electronic design comprising a plurality of connected standard cells;
   generating a timing report, using a processor, for the electronic design, wherein the timing report comprises one or more failed-timing paths and each failed-timing path comprises a plurality of cells;
   generating a megacell for said each failed-timing path, wherein the megacell and the failed-timing path perform a same function;
   determining a critical transistor count for the megacell, wherein the critical transistor count for the megacell includes at least a megacell stack number count;
   determining a critical transistor count for the failed-timing path, wherein the critical transistor count for the failed-timing path includes at least a failed-timing path stack number count;
   determining whether the megacell optimizes the failed-timing path using an optimizing constraint, wherein the optimizing constraint comprises a minimum reduction of the critical transistor count from the failed-timing path to the megacell, and a specified difference in the megacell stack number count and the failed-timing path stack number count;

replacing the failed-timing path with the megacell when the megacell optimizes the failed-timing path, and, generating a violation-free layout for the megacell using a megacell netlist.

2. The method of claim 1, wherein the minimum reduction of the critical transistor count from the failed-timing path to the megacell is 2.

3. The method of claim 1, wherein the optimizing constraint further comprises:

a specified reduction of total cell area from the failed-timing path to the megacell; or a specified reduction of power consumption from the failed-timing path to the megacell.

4. The method of claim 3, further comprising receiving one or more optimizing constraint specifying one or more of:

the minimum reduction of the critical transistor count from the failed-timing path to the megacell;

the specified difference in stack number count of the failed-timing path and the megacell;

the specified reduction of total cell area from the failed-timing path to the megacell; and, the specified reduction of power consumption from the failed-timing path to the megacell.

5. The method of claim 1, wherein generating a violation-free layout for the megacell using the netlist comprises:

fixing design rule check (DRC) violations in the netlist; and, placing and routing the netlist using one or more routing priority modes to generate a violation-free layout; wherein a violation-free layout includes no un-routable nets.

6. The method of claim 5, wherein placing and routing the netlist using one or more routing priority modes to generate a violation-free layout comprises:

placing and routing the netlist using a first routing priority mode to generate a first layout;

if any nets is un-routable, analyzing the un-routable nets;

selecting a second routing priority mode to route the un-routable nets using the analysis of the un-routable nets;

placing and routing the netlist using the second routing priority mode to generate a second layout;

repeating the analyzing, selecting, placing and routing, and comparing until no un-routable nets are found; and, comparing the second layout to a schematic of the megacell.

7. The method of claim 1, wherein generating a megacell for each failed-timing path comprises:

extracting a set of cascaded logic gates for said each failed-timing path;

converting the set of cascaded logic gates for each failed-timing path to a function for each failed-timing path;

optimizing the function for each failed-timing path;

generating a binary tree using the optimized function; and generating a megacell netlist using the binary tree.

8. The method of claim 7, wherein the optimizing the function for each failed-timing path comprises using dynamic programming to find an optimized function.

9. The method of claim 1, further comprising:

performing a timing test using an electronic design including one or more megacells; and generating a timing report comprising no failed-timing paths.

10. The method of claim 1, further comprising implementing a layout for the electronic design including one or more megacells on a plurality of photomasks.

11. A system comprising:

a computer-readable storage medium containing data representing an electronic design, said electronic design comprising a plurality of connected standard cells from a standard library; and a processor coupled to read the storage medium, the processor configured for:

generating a timing report for the electronic design, wherein the timing report comprising one or more failed-timing paths and each failed-timing path comprises a plurality of cells;

generating a megacell for each failed-timing path, wherein:

the megacell and the failed-timing path perform a same function, and generating the megacell for each failed-timing path comprises extracting a set of cascaded logic gates for each failed-timing path;

determining a critical transistor count for the megacell, wherein the critical transistor count for the megacell includes at least a megacell stack number count;

determining a critical transistor count for the failed-timing path, wherein the critical transistor count for the failed-timing path includes at least a failed-timing path stack number count;

determining whether the megacell optimizes the failed-timing path using an optimizing constraint, wherein the optimizing constraint comprises a minimum reduction of the critical transistor count from the failed-timing path to the megacell, and a specified difference in the megacell stack number count and the failed-timing path stack number count;

replacing the failed-timing path with the megacell when the megacell optimizes the failed-timing path, generating a violation-free layout for the megacell using a megacell netlist; and, incorporating the megacell layout into a layout for the electronic design; and, an output device coupled to the processor for outputting the layout for the electronic design.

12. The system of claim 11, wherein the output device is a display, a printer, or the computer-readable storage medium.

13. The system of claim 11, wherein the computer-readable storage medium further contains a design rule check (DRC) deck.

14. The system of claim 11, further comprising an input device for receiving an optimizing constraint.

15. The system of claim 11, wherein the processor is further configured for:

implementing the violation-free layout on a plurality of photomasks.

16. A method of optimizing timing of an electronic design, the method comprising:

receiving an electronic design comprising a plurality of connected standard cells;

generating a timing report, using a processor, for the electronic design, wherein the timing report comprises a failed-timing path, the failed-timing path comprises a plurality of cells;

generating a first megacell for said the failed-timing path, wherein the first megacell and the failed-timing path perform a same function;

generating a second megacell for a timing path other than the failed-timing path;

determining a critical transistor count for the failed-timing path;

determining a critical transistor count for the first megacell;

determining whether the first megacell optimizes the failed-timing path using a first optimizing constraint comprising a minimum reduction of the critical transistor count from the failed-timing path to the first megacell;

replacing the failed-timing path with the first megacell when the first megacell optimizes the failed-timing path;

determining whether the second megacell optimizes the timing path other than the failed-timing path using a second optimizing constraint comprising a specified difference in a second megacell stack number count and a stack number count of the timing path other than the failed-timing path; and replacing the timing path other than the failed-timing path with the second megacell when the second megacell optimizes the timing path other than the failed-timing path.

17. The method of claim 16, wherein generating the timing report comprises evaluating the electronic design along a worst-case scenario signal path.

18. The method of claim 16, wherein generating the first megacell comprises:

extracting a set of cascaded logic gates for said failed-timing path;

converting the set of cascaded logic gates to a function for the failed-timing path;

optimizing the function for the failed-timing path;

generating a binary tree using the optimized function; and generating a megacell netlist using the binary tree.

19. The method of claim 18, wherein generating the binary tree is performed prior to optimizing the function for the failed-timing path.

20. A system comprising:

a computer-readable storage medium containing data representing an electronic design, said electronic design comprising a plurality of connected standard cells from a standard library; and a processor coupled to read the storage medium, the processor configured for:

receiving an electronic design comprising a plurality of connected standard cells;

generating a timing report for the electronic design, wherein the timing report comprises a failed-timing path, the failed-timing path comprises a plurality of cells;

generating a first megacell for said the failed-timing path, wherein the first megacell and the failed-timing path perform a same function;

generating a second megacell for a timing path other than the failed-timing path;

determining a critical transistor count for the failed-timing path;

determining a critical transistor count for the timing path other than the failed-timing path;

determining a critical transistor count for the first megacell;

determining a critical transistor count for the second megacell;

determining whether the first megacell optimizes the failed-timing path using a first optimizing constraint, wherein the first optimizing constraint comprises:

a minimum reduction of the critical transistor count from the failed-timing path to the first megacell; and a specified difference in a first megacell stack number count and a failed-timing path stack number count;

replacing the failed-timing path with the first megacell when the first megacell optimizes the failed-timing path; and determining whether the second megacell optimizes the timing path other than the failed-timing path using a second optimizing constraint comprising a minimum reduction of the critical transistor count from the timing path other than the failed-timing path to the second megacell; and replacing the timing path other than the failed-timing path with the second megacell when the second megacell optimizes the timing path other than the failed-timing path.

* * * * *